(12) United States Patent
Tsukahara et al.

(10) Patent No.: US 9,128,846 B2
(45) Date of Patent: Sep. 8, 2015

(54) DISK ARRAY DEVICE, CONTROL DEVICE AND DATA WRITE METHOD

(71) Applicant: FUJITSU LIMITED, Kawasaki-shi, Kanagawa (JP)

(72) Inventors: Ryota Tsukahara, Kawasaki (JP); Norihide Kubota, Kawasaki (JP); Atsushi Igashira, Yokohama (JP); Kenji Kobayashi, Kawasaki (JP); Hidejirou Daikokuya, Kawasaki (JP); Kazuhiko Ikeuchi, Kawasaki (JP); Takeshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 13/650,682

(22) Filed: Oct. 12, 2012

(65) Prior Publication Data
US 2013/0151771 A1 Jun. 13, 2013

(30) Foreign Application Priority Data

Dec. 13, 2011 (JP) .................. 2011-272832

(51) Int. Cl.
*G06F 12/08* (2006.01)
*G06F 11/10* (2006.01)
*G06F 3/06* (2006.01)

(52) U.S. Cl.
CPC ............ *G06F 12/0804* (2013.01); *G06F 3/061* (2013.01); *G06F 3/064* (2013.01); *G06F 3/0689* (2013.01); *G06F 11/1076* (2013.01); *G06F 12/0868* (2013.01); *G06F 2211/1057* (2013.01); *G06F 2211/1059* (2013.01); *G06F 2212/262* (2013.01)

(58) Field of Classification Search
CPC .................. G06F 11/1056; G06F 2211/1085; G06F 3/0689; G06F 3/061; G06F 3/064
USPC ........................................................ 711/114
See application file for complete search history.

(56) References Cited

U.S. PATENT DOCUMENTS

| 5,315,602 | A | * | 5/1994 | Noya et al. ............... 714/766 |
| 6,282,671 | B1 | * | 8/2001 | Islam et al. ............... 714/6.22 |
| 6,513,093 | B1 | * | 1/2003 | Chen et al. ............... 711/4 |
| 2006/0123200 | A1 | | 6/2006 | Ito et al. |
| 2006/0200697 | A1 | | 9/2006 | Ito |
| 2007/0067667 | A1 | | 3/2007 | Ikeuchi et al. |

(Continued)

FOREIGN PATENT DOCUMENTS

| JP | 7-110788 | 4/1995 |
| JP | 7-311659 | 11/1995 |

(Continued)

OTHER PUBLICATIONS

Japanese Office Action dated Jul. 7, 2015 in corresponding Japanese Patent Application No. 2011-272832.

*Primary Examiner* — Kalpit Parikh
(74) *Attorney, Agent, or Firm* — Staas & Halsey LLP

(57) ABSTRACT

A disk array device includes: a plurality of disk devices including a strip that stores divided data or a parity; a control device to divide the stripe for each of the plurality of disk devices into the divided data having a size of the strip and write the divided data; and a memory to store new data that corresponds to the divided data stored in the strip, wherein the control device detects whether or not the new data is discrete and performs a first write operation or a second write operation when the new data is discrete.

15 Claims, 15 Drawing Sheets

(56) References Cited

U.S. PATENT DOCUMENTS

| | | | |
|---|---|---|---|
| 2008/0109616 A1* | 5/2008 | Taylor | 711/155 |
| 2010/0241802 A1 | 9/2010 | Igashira et al. | |
| 2011/0208995 A1* | 8/2011 | Hafner et al. | 714/6.24 |
| 2012/0221809 A1* | 8/2012 | Yoshikawa et al. | 711/155 |

FOREIGN PATENT DOCUMENTS

| | | |
|---|---|---|
| JP | 2006-163474 | 6/2006 |
| JP | 2006-244122 | 9/2006 |
| JP | 2007-87094 | 4/2007 |
| JP | 2010-218485 | 9/2010 |

* cited by examiner

DEPTH

DEPTH

FIG. 14

| NUMBER OF DISKS FOR UPDATING | PERFORM FILL SMALL WRITE | PERFORM FILL READ BANDWIDTH WRITE |
|---|---|---|
| 9 | 10 COMMANDS | 9 COMMANDS |
| 8 | 9 COMMANDS | 9 COMMANDS |

FIG. 15

| NUMBER OF DISKS FOR UPDATING | NUMBER OF DISKS TO BE UPDATED WITH FULL DEPTH | PERFORM FILL SMALL WRITE | PERFORM FILL READ BANDWIDTH WRITE |
|---|---|---|---|
| 7 | 6 | 8 COMMANDS | 3 COMMANDS |
| 7 | 5 | 8 COMMANDS | 4 COMMANDS |
| 7 | 4 | 8 COMMANDS | 5 COMMANDS |
| 7 | 3 | 8 COMMANDS | 6 COMMANDS |
| 7 | 2 | 8 COMMANDS | 7 COMMANDS |
| 7 | 1 | 8 COMMANDS | 8 COMMANDS |
| 6 | 5 | 7 COMMANDS | 4 COMMANDS |
| 6 | 4 | 7 COMMANDS | 5 COMMANDS |
| 6 | 3 | 7 COMMANDS | 6 COMMANDS |
| 6 | 2 | 7 COMMANDS | 7 COMMANDS |
| 6 | 1 | 7 COMMANDS | 8 COMMANDS |
| 5 | 4 | 6 COMMANDS | 5 COMMANDS |
| 5 | 3 | 6 COMMANDS | 6 COMMANDS |
| 5 | 2 | 6 COMMANDS | 7 COMMANDS |
| 5 | 1 | 6 COMMANDS | 8 COMMANDS |
| 4 | 3 | 5 COMMANDS | 6 COMMANDS |
| 4 | 2 | 5 COMMANDS | 7 COMMANDS |
| 4 | 1 | 5 COMMANDS | 8 COMMANDS |

DISK ARRAY DEVICE, CONTROL DEVICE AND DATA WRITE METHOD

CROSS-REFERENCE TO RELATED APPLICATIONS

This application is based upon and claims the benefit of priority of the prior Japanese Patent Application No. 2011-272832, filed on Dec. 13, 2011, the entire contents of which are incorporated herein by reference.

FIELD

The embodiments discussed herein relate to a disk array device, a control device, and a data write method.

BACKGROUND

A Redundant Arrays of Inexpensive Disks (RAID) device records a large amount of data handled by a computer system. For example, a RAID 5 protects data with a cost-effective and simple configuration. A RAID 6 that demonstrates higher reliability than the RAID 5 is also used.

Related techniques are discussed in Japanese Laid-Open Patent Publication No. 2007-87094, Japanese Laid-Open Patent Publication No. 7-311659, Japanese Laid-Open Patent Publication No. 7-110788, and Japanese Laid-Open Patent Publication No. 2006-163474.

SUMMARY

According to one aspect of the embodiments, a disk array device includes: a plurality of disk devices including a strip that stores divided data or a parity; a control device to divide the stripe for each of the plurality of disk devices into the divided data having a size of the strip and write the divided data; and a memory to store new data that corresponds to the divided data stored in the strip, wherein the control device detects whether or not the new data is discrete and performs a first write operation or a second write operation when the new data is discrete.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 illustrates an exemplary number of commands;
and
FIG. 15 illustrates an exemplary number of commands.

DESCRIPTION OF EMBODIMENT

In RAID 5 and 6, parity is updated when conducting write back processing to maintain data redundancy by using parity. Write back processing may be, for example, a processing for writing data in a cache to a disk when updating the data.

In the RAID 5 and 6, when one stripe amount of new data is ready, a new parity may be generated with only the new data and be written on a disk (bandwidth write). When data close to the one stripe amount is updated, the data before the updating is read from the disk. A new parity may be generated with the bandwidth write method after the one stripe amount of data is read, and the new parity is written on the disk (read bandwidth write). The data to be updated and the parity before the updating (old parity) are read from the applicable disk, a new parity may be generated from the data to be updated, the parity before updating, and the new data, and the new parity is written on the disk (small write).

In read bandwidth write, data before updating that is not subject to updating is read from the disk. In small write, data before updating is read from the applicable disk. For example, if the data read from the disk is discrete (non-continuous), commands may be issued for units of the discrete data.

If the data read from the disk is discrete (non-continuous), the read data before updating that is not subject to updating and the read data before updating that is subject to updating is discrete.

Figure 1:
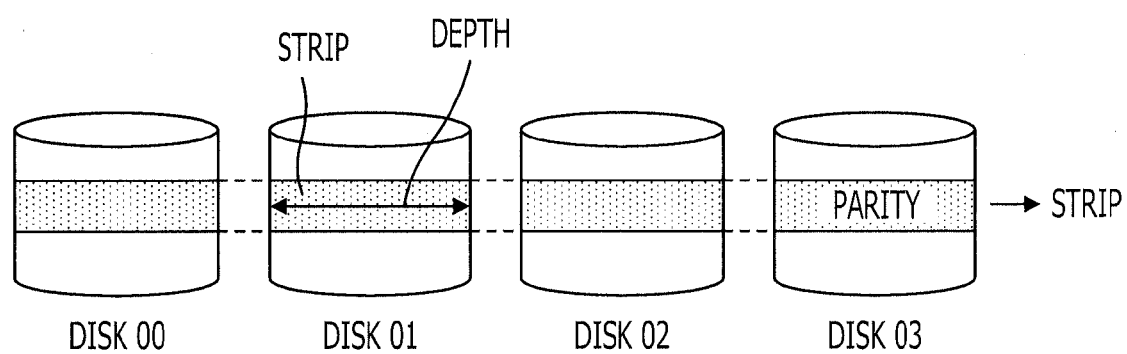
FIG. 1 illustrates an exemplary striping.

FIG. 1 illustrates an exemplary striping. FIG. 1 illustrates striping according to RAID 5.

Divided data and parities are stored in a plurality of disk devices in RAID 5. Unlike RAID 4 in which parities are placed in specific disk devices, parities in RAID 5 are distributed and placed in order in the plurality of disk devices.

The RAID 5 includes four disk devices disk 00 to disk 03. In FIG. 1, for example, data may be divided and stored in the disk 00 to the disk 02, and a parity corresponding to the divided data may be stored in the disk 03.

The set of the divided data and the parity corresponding to the divided data may be referred as a "stripe." Regions of the disks that store the divided data and the parity may be referred as "strips." The size of a strip may be referred as the "stripe depth," or may be referred as "depth."

Figure 2A:
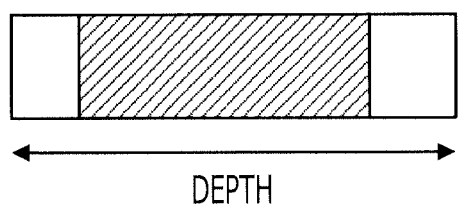
FIG. 2A illustrates an exemplary continuous data.
Figure 2B:
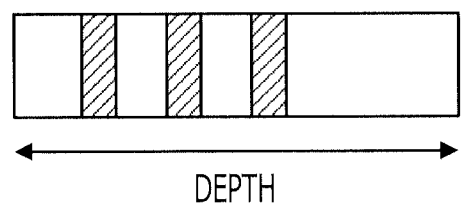
FIG. 2B illustrates an exemplary discrete data.

FIG. 2A illustrates exemplary continuous data and FIG. 2B illustrates exemplary discrete data. In FIGS. 2A and 2B, positions of new data inside the strips are indicated by the hatched portions.

The continuous data may be one continuous data of the new data. The discrete data may be non-continuous data of the new data.

Figure 3:
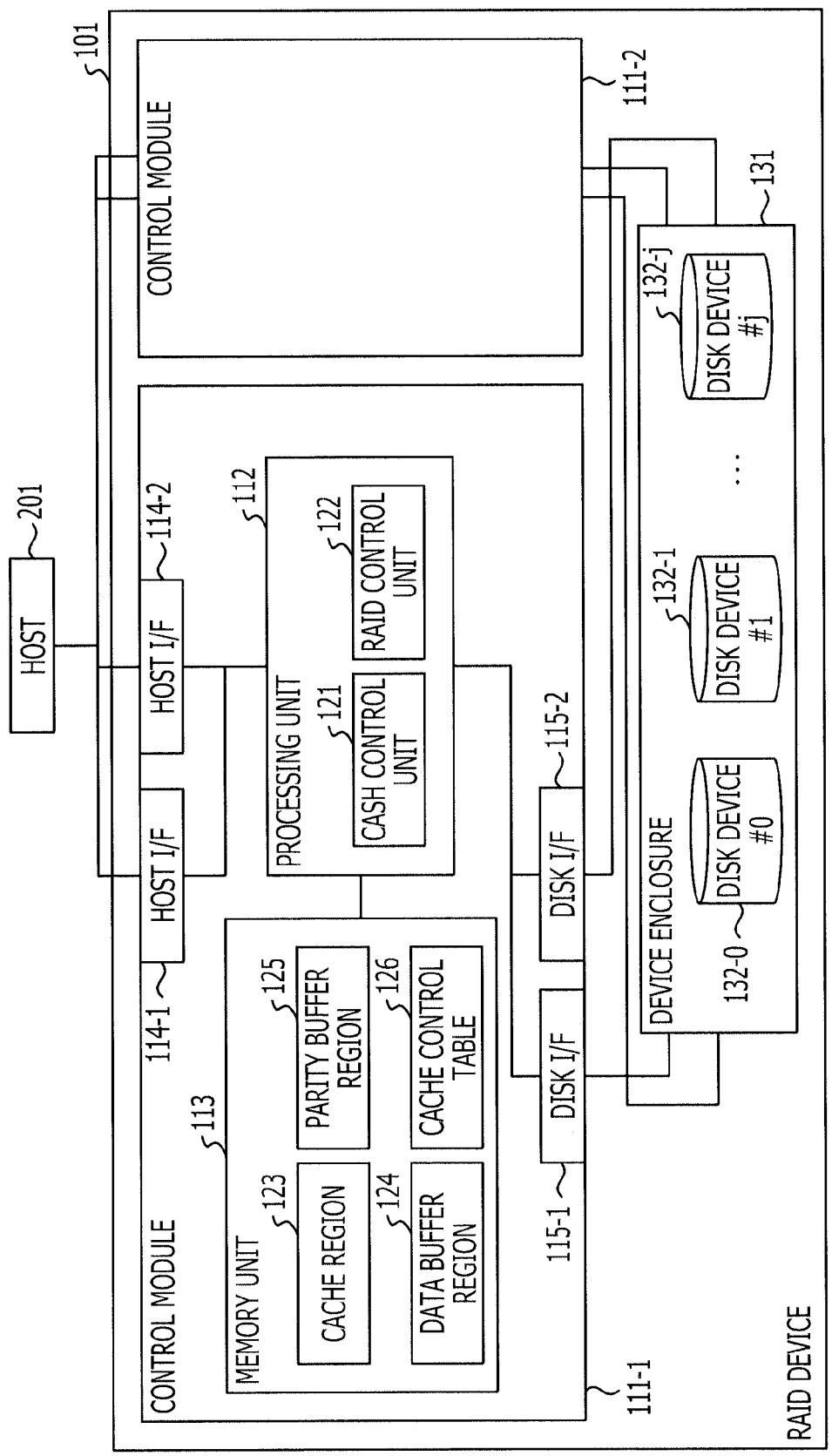
FIG. 3 illustrates an exemplary RAID device.

FIG. 3 illustrates an exemplary RAID device. A RAID device 101 is coupled to a host 201. The RAID device 101 includes a control module 111-*m* (m=1 to 2) and a device enclosure 131.

The configuration of the control module 111-1 is substantially the same or similar to the control module 111-2, thus FIG. 3 illustrates the configuration of the control module 111-1.

The control module 111-1 includes a processing unit 112, a memory unit 113, a host I/F 114-*m*, and a disk I/F 115-*m*.

The processing unit 112 is a processor that performs various types of processing. The processing unit 112 includes a cache control unit 121 and a RAID control unit 122. The cache control unit 121 instructs the RAID control unit 122 to begin write back processing and the like.

The RAID control unit 122 reads data from disk devices 132, writes data in the disk devices 132, and generates a parity. The memory unit 113 stores various types of data. The memory unit 113 may be, for example, a random access memory (RAM).

The memory unit 113 includes a cache region 123, a data buffer region 124, a parity buffer region 125, and a cache control table 126. The cache region 123 temporarily stores new data received from the host 201.

The data buffer region 124 temporarily stores data read from the disk devices 132. The parity buffer region 125 stores parities read from the disk devices 132 and newly generated parities.

Information related to the new data stored in the cache region 123 is included in the cache control table 126. For example, information that indicates which stripe data is the new data, which strip the data is stored in, and which disk device 132 that the data is stored is included in the cache control table 126. Information that indicates which data position in the strip is the new data is included in the cache control table 126. Thus, the RAID control unit 122 detects whether the new data is continuous data or discrete data by referring to the cache control table 126.

The host I/F 114 is coupled to the host 201 and may be an interface for conducting the transmitting and receiving of data to and from the host 201. The disk I/F 115 is coupled to the device enclosure 131 and may be an interface for conducting the transmitting and receiving of data to and from the device enclosure 131.

The device enclosure 131 stores a plurality of disk devices 132-$i$ (i=0 to j (where j is an integer not less than 2)). The disk devices 132 may be magnetic disc devices (hard disk drives (HDD)) for storing data.

A write method includes "fill small write" and "fill read bandwidth write."

The RAID control unit 122 may conduct small write, read bandwidth write, fill small write, and fill read bandwidth write. Any of the above write methods may be performed according to a selection result.

To provide a simple explanation, for example, one stripe may be updated. Reading, form the disk devices, continuous data to be updated based on new data may be performed in strip units, for example, in units of entire data inside a strip, when performing fill small write.

Figure 4:
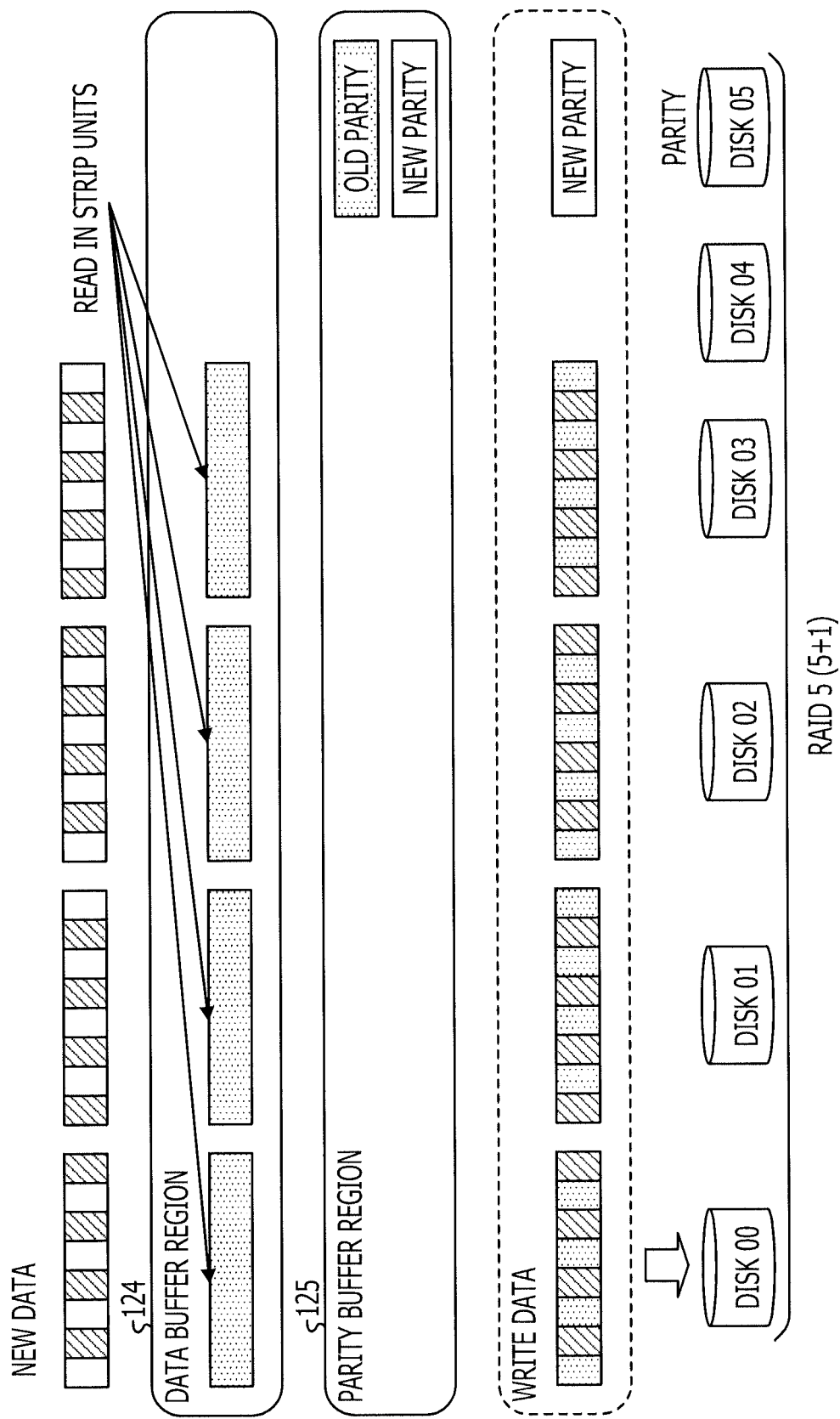
FIG. 4 illustrates an exemplary Fill Small Write.

FIG. 4 illustrates an exemplary fill small write. The RAID device indicated in FIG. 4 performs RAID 5 with a RAID 5 (5+1) configuration, for example, with six disks.

The RAID device indicated in FIG. 4 includes six disk devices disk 00 to disk 05. Data may be stored in the disks 00 to 04 and parity may be stored in the disk 05 in stripes that include the data to be updated based on the new data.

The new data may be data for updating one certain stripe. The hatched portions in FIG. 4 represent new data of the disks 00 to 03 that is discrete data having discrete regions. The new data is stored in the cache region 123.

The RAID control unit 122 reads, from the disks 00 to 03, the data of the entire strip including the region to be updated according to the new data within the stripe to be updated according to the new data, and stores the data in the data buffer region 124. The RAID control unit 122 reads the parity from the disk 05 and stores the read parity (old parity) in the parity buffer region 125. Upon reading the parity and the data of the entire strip included in the regions to be updated according to the new data, the RAID control unit 122 issues, to each of the disks (disks 00 to 03 and disk 05) having the read data, one read command to read the parity and the data of the entire strip including the region to be updated according to the new data. For example, five read commands may be issued. The RAID control unit 122 determines which stripe is to be updated and which strip is to be updated by referring to the cache control table 126.

The RAID control unit 122 uses the new data, the parity (old parity), and the data to be updated among the data read from the disks 00 to 03 to generate a new parity. The new parity may be generated by, for example, an exclusive logical OR (XOR) calculation. In the case of RAID 6, a plurality of parities are generated using a calculation method such as weighting by coefficients in addition to the XOR calculation. The new parity is stored in the parity buffer region 125.

The RAID control unit 122 combines the new data with data not to be updated among the data read from the disks 00 to 03 to generate write data for writing into the disks 00 to 03. The write data is generated in strip units.

The RAID control unit 122 writes the write data in the disks 00 to 03 and writes the new parity in the disk 05. The data of all the strips is read from the disks 00 to 03 and from disk 05 in fill small write. The number of processing commands may be reduced since the data of all the strips is read with one read processing command when reading the data.

Since write data of all the strips is generated, the write data is written in one strip with one write command. The number of processing commands may be reduced.

With fill read bandwidth write, reading, form the disk devices, pre-update data not subject to updating in continuous may be read in strip units, e.g., in units of all data inside a strip.

Figure 5:
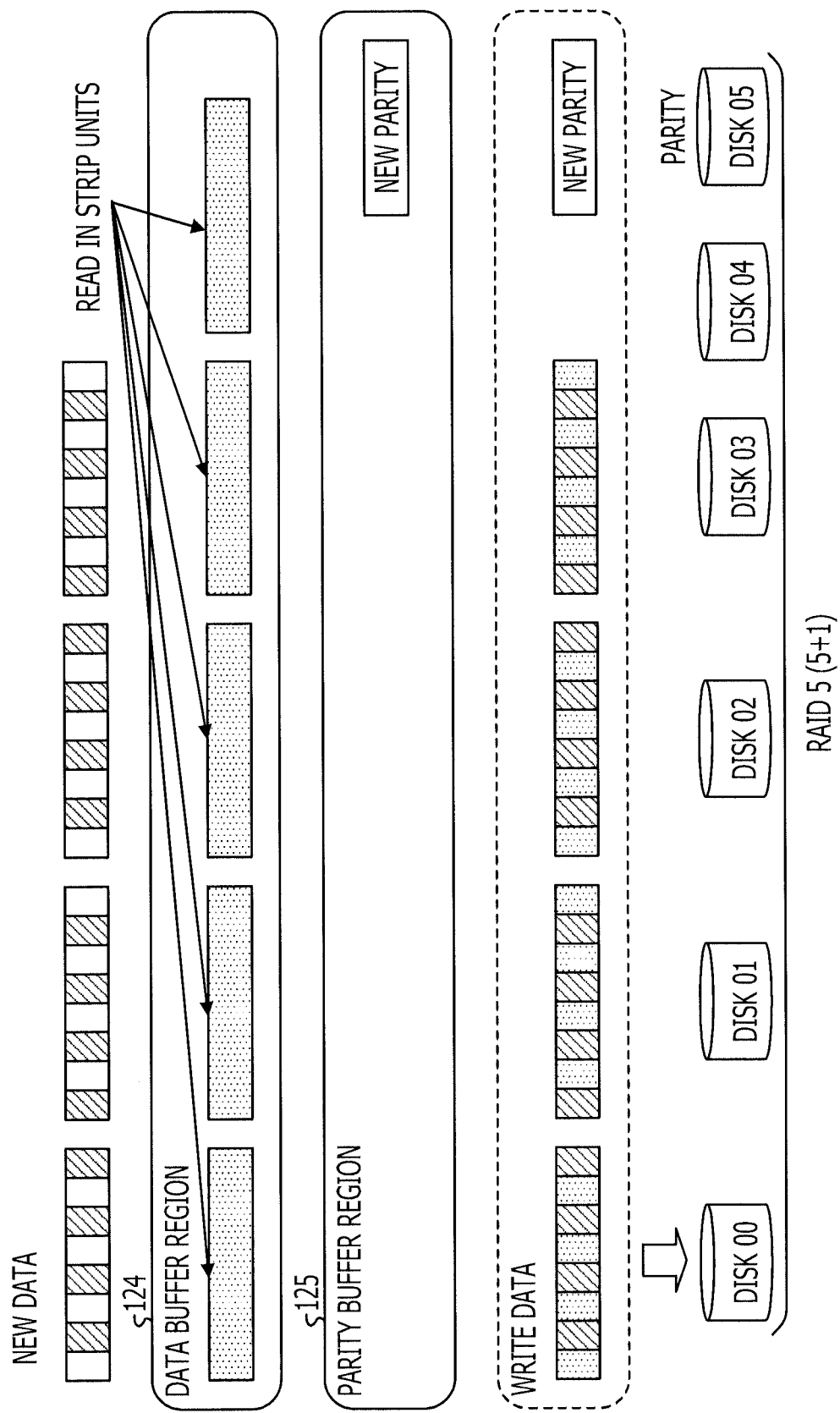
FIG. 5 illustrates an exemplary Fill Read Bandwidth Write.

The RAID device illustrated in FIG. 5 performs RAID 5 with a RAID 5 (5+1) configuration, for example, with six disks. The RAID device illustrated in FIG. 5 includes six disk devices disk 00 to disk 05. Data may be stored in the disks 00 to 04 and parity may be stored in the disk 05 in stripes that include the data to be updated based on the new data.

The new data may be data for updating one certain stripe. The new data of disks 00 to 03 that is discrete data having discrete regions as indicated by the hatched portions in FIG. 5 is stored in the cache region 123.

The RAID control unit 122 reads from the disks 00 to 04 the data of all the strips including the regions not to be updated according to the new data within the stripe to be updated according to the new data, and stores the data in the data buffer region 124. Upon reading the data of all the strips including the regions not to be updated by the new data, the RAID control unit 122 issues one read command to read the data of all the strips including the regions not to be updated by the new data to each of the disks (disks 00 to 04) that have the data for reading. For example, five read commands may be issued. The RAID control unit 122 determines which stripe is to be updated and which strip is to be updated by referring to the cache control table 126.

The RAID control unit 122 uses the new data and the data not to be updated among the data read from the disks 00 to 04 to generate a new parity. The new parity may be generated, for example, with a non-exclusive OR (XOR) calculation. In the case of RAID 6, a plurality of parities are generated using a calculation method such as weighting by coefficients in addition to the XOR calculation. The new parity is stored in the parity buffer region 125.

The RAID control unit 122 combines the new data with data not to be updated among the data read from the disks 00 to 04 to generate write data for writing into the disks 00 to 03.

The write data is generated in strip units. The RAID control unit 122 writes the write data in the disks 00 to 03 and writes the new parity in the disk 05.

With fill read bandwidth write, the data of all the strips is read from the disks 00 to 04. The number of processing commands may be reduced in comparison to read bandwidth write since the data of one entire strip is read with one read processing command.

The number of processing commands may be reduced in comparison to read bandwidth write since the write data of all the strips is written into one strip with one write command.

Figure 6:
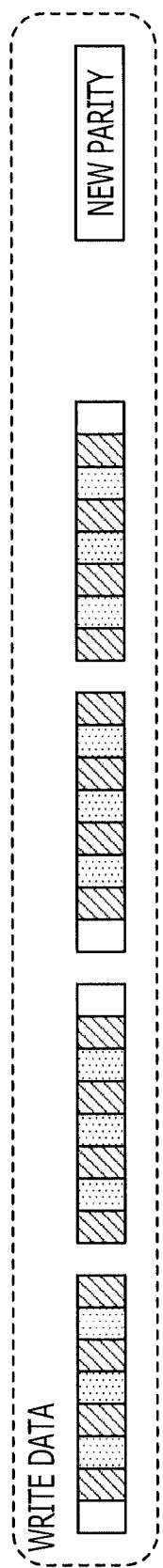
FIG. 6 illustrates an exemplary write data.

FIG. 6 illustrates an exemplary write data. As illustrated in FIG. 6, write data may be generated using the data not to be updated sandwiched between blocks of new data. For example, data where first data or last data in a strip is not updated may not be used for generating the write data.

Figure 7:
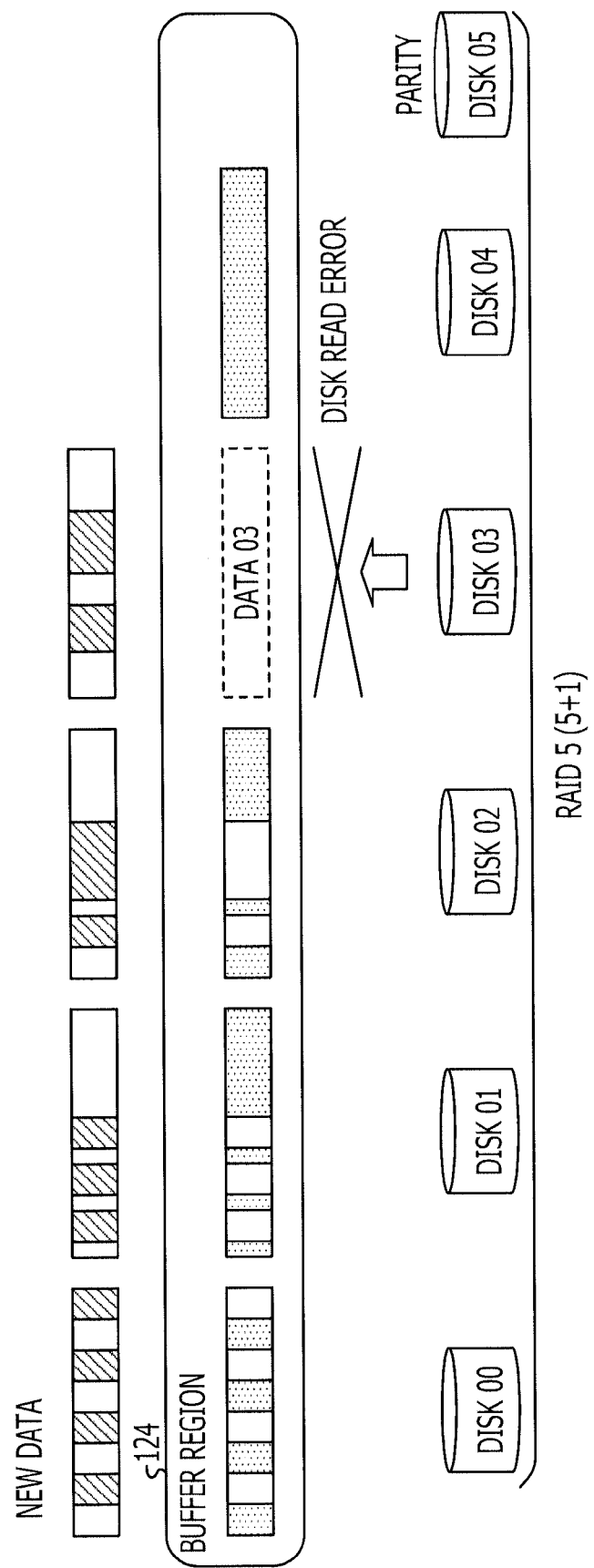
FIG. 7 illustrates an exemplary Read Bandwidth Write processing error.
Figure 8:
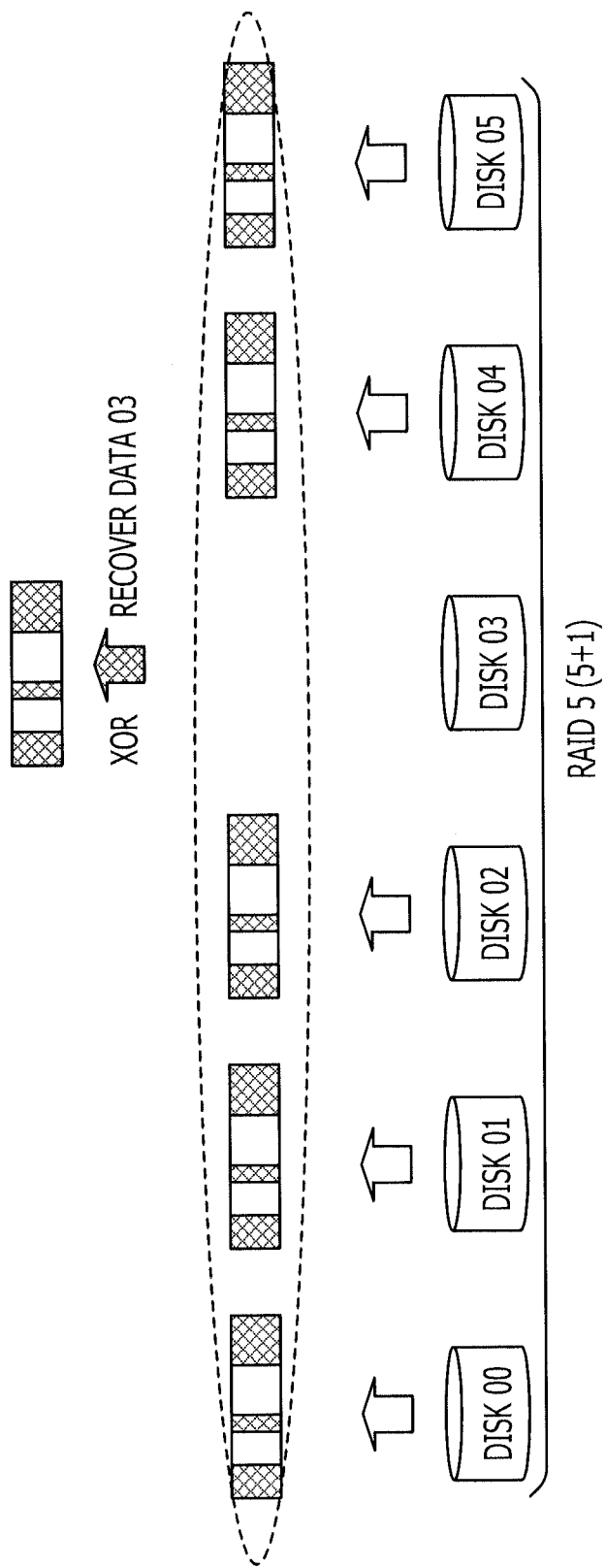
FIG. 8 illustrates an exemplary data recovery processing.

FIG. 7 illustrates an exemplary error in a read bandwidth write process. FIG. 8 illustrates an exemplary data recovery processing.

The RAID device indicated in FIG. 7 performs RAID 5 with a RAID 5 (5+1) configuration for example, with six disks. The RAID device includes six disk devices disk 00 to disk 05, and parity corresponding to the new data is stored in the disk 05.

The new data may be new data for disks 00 to 03. In read bandwidth write, data before updating that is not subject to updating is read from the disks and stored in the data buffer region 124. An error occurs in disk 03 so that the data may not be able to be read.

For example, data for recovering the disk having the read failure (disk 03) is read from the disks (disks 00 to 02, 04, and 05) other than the disk 03. An XOR calculation is performed using the read data and the read parity so that the data of disk 03 is generated and disk 03 is recovered. This processing is referred as "regeneration read."

Figure 9:
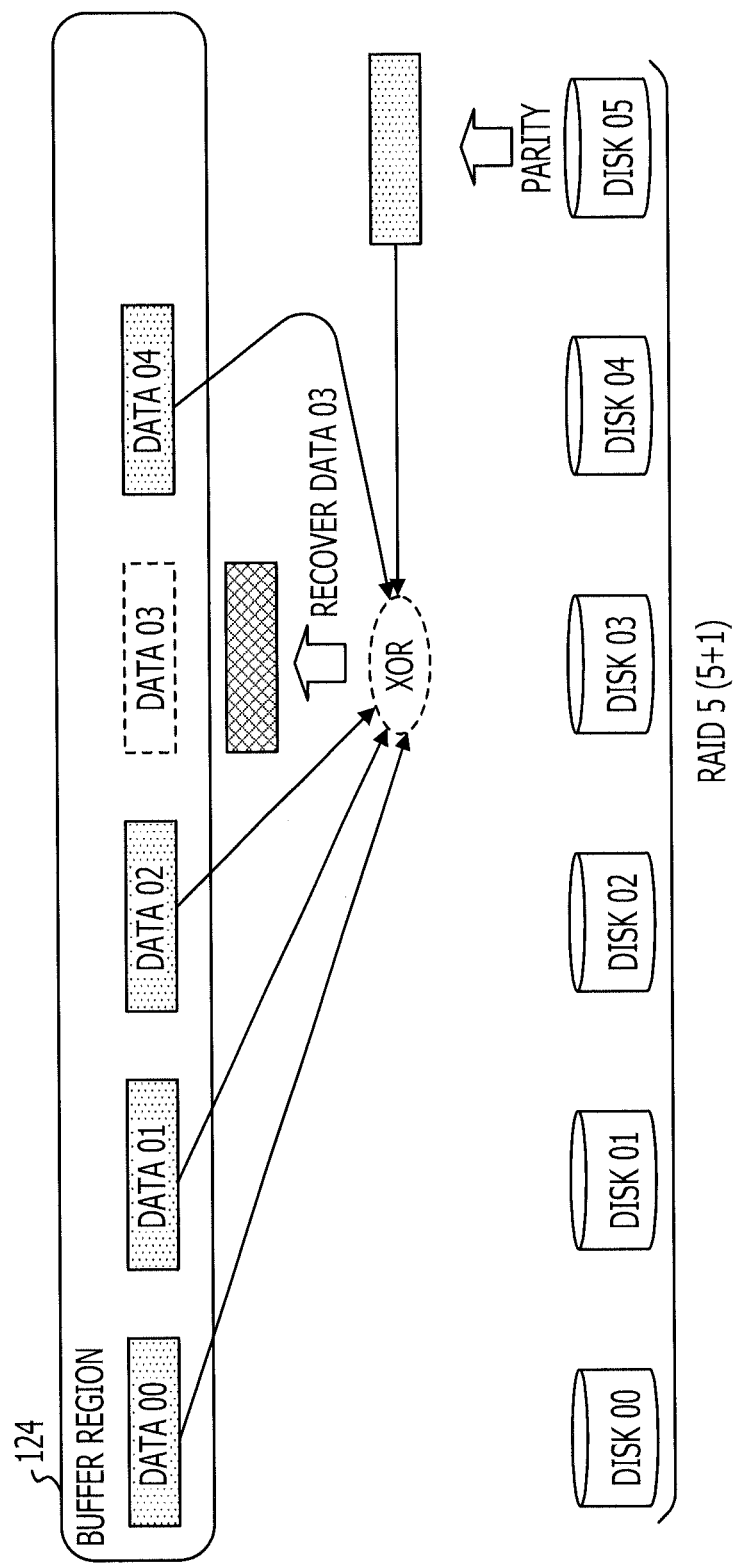
FIG. 9 illustrates an exemplary data recovery processing.

FIG. 9 illustrates an exemplary data recovery processing. FIG. 9 illustrates data recovery processing using fill read bandwidth write. For example, a read error occurs in disk 03 so that the data may not be able to be read.

In fill read bandwidth write, the data of all the strips is read at a first discrete time and the data is stored in the data buffer region 124. By reading the parity from the disk 05 without reading the data from the disks 00 to 02 and disk 04, the data for recovering the disk 03 may be prepared.

In data recovery processing, the XOR calculation is performed with the data of all the strips of disks 00 to 02 and disk 04 stored in the data buffer region 124, and with the parity read from the disk 05 so that the data of the disk 03 is generated and the disk 03 is recovered.

Since no data other than the parity may be read from the disks in the data recovery processing, the number of disk accesses may be reduced and the processing time may be shortened.

In selecting a write method, a value may be used that is estimated in the total of the disk reads and disk writes with respect to at least one parameter of the number of processing commands, the amount of data transfer and the number of XOR calculations, or all of the above-mentioned parameters.

A low efficiency write method may be selected according to the number of processing commands based on discrete data.

In the selection processing of the write method, it is determined whether the new data is discrete data or not. If the new data is not discrete data, small write or read bandwidth write is performed. If the new data is discrete data, fill small write or fill read bandwidth write is performed.

Based on the number of disks subject to updating, a write method in which the number of processing commands during reading is small may be selected in the selection processing of the write method. Since the number of processing commands during writing in fill read bandwidth is substantially the same as that in fill small write, the number of processing commands during reading may be considered.

Since a noticeable factor of the processing time difference between fill read bandwidth write and fill small write is the number of data accesses, the number of processing commands may be considered among the parameters of the number of processing commands, the amount of data transfer, and the number of XOR calculations.

Figure 10:
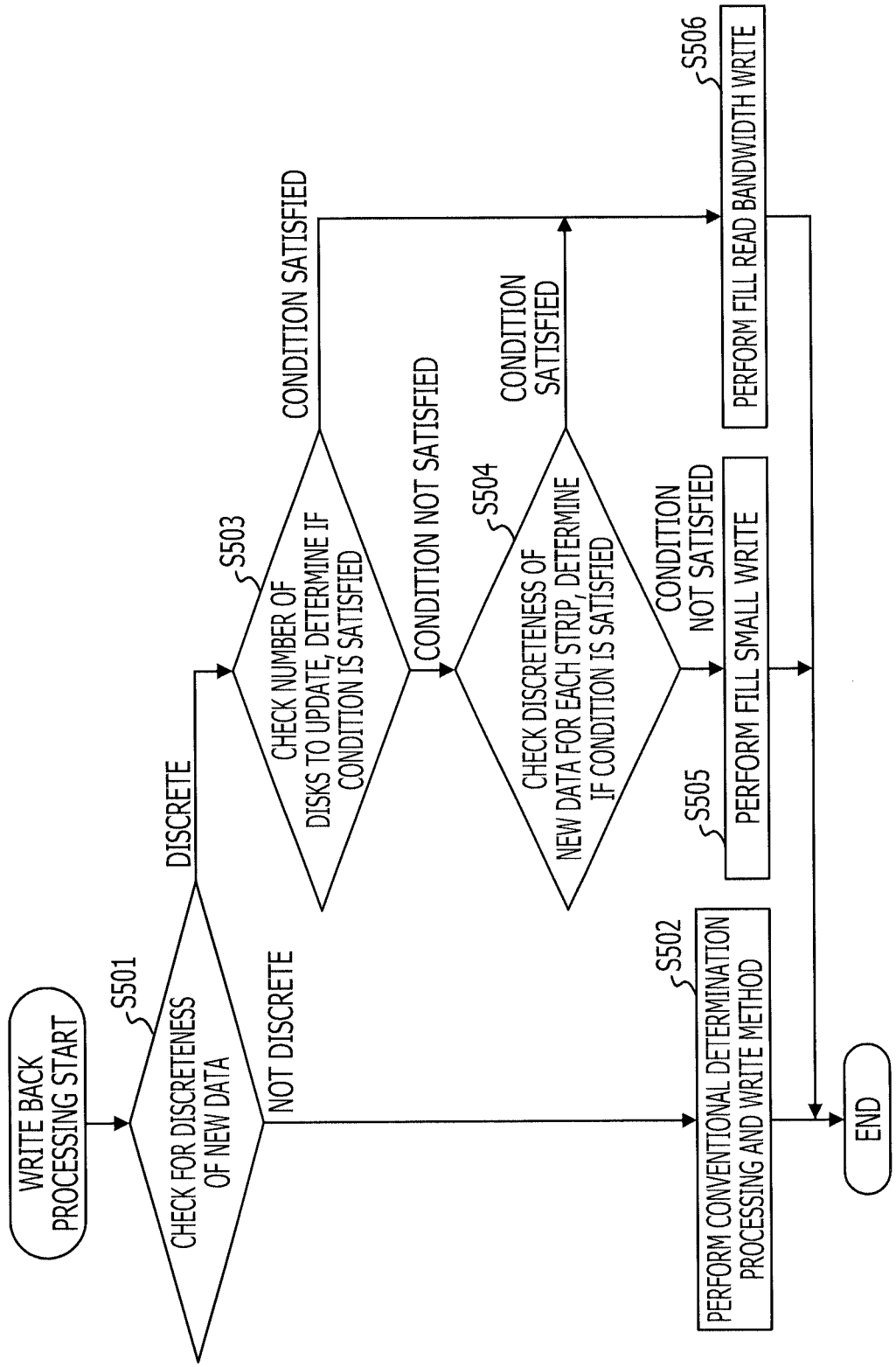
FIG. 10 illustrates an exemplary selection processing.

FIG. 10 illustrates an exemplary selection processing. A write method is selected in FIG. 10. The cache control unit 121 instructs the RAID control unit 122 to begin write back processing. The RAID device 101 receives new data from the host 201 and stores the new data in the cache region 123.

In operation S501, the RAID control unit 122 checks whether or not the new data is discrete. Whether or not the new data is discrete may be determined by referring to the cache control table 126.

If the new data is discrete, the processing proceeds to operation S503. If the new data is not discrete, the processing proceeds to operation S502. In operation S502, the RAID control unit 122 selects small write or read bandwidth write, for example, and uses the selected write method to perform the new data writing. For example, a selection processing described in Japanese Laid-Open Patent Publication No. 2007-87094 may be adopted.

In operation S503, the RAID control unit 122 checks the number (number of disks subject to updating) of disk devices to update. The RAID control unit 122 determines whether or not a condition 1 is satisfied. For example, the RAID control unit 122 determines whether or not the number of disks subject to updating is equal to or greater than (the number of disks in the RAID configuration−2) when the RAID device 101 is operating under RAID 5. The RAID control unit 122 determines whether or not the number of disks subject to updating is equal to or greater than (the number of disks in the RAID configuration−3) when the RAID device 101 is operating under RAID 6. The number of disks in the RAID configuration may be the number of disk devices included in the RAID.

If the condition 1 is satisfied, the processing proceeds to operation S506. If the condition 1 is not satisfied, the processing proceeds to operation S504. The RAID 5 condition 1 may be a condition that the number of disks subject to updating is greater than or equal to (the number of disks in the RAID configuration−2). The RAID 6 condition 1 may be a condition that the number of disks subject to updating is greater than or equal to (the number of disks in the RAID configuration−3).

In operation S504, the RAID control unit 122 checks for the presence of discreteness of the new data for each strip in which the new data is written. Whether or not discreteness is present may be determined by referring to the cache control table 126. The RAID control unit 122 checks whether the new data written in each strip is the data of all the strips, and also checks the number of strips for which the entire strip is subject to updating.

The RAID control unit 122 determines whether or not a condition 2 is satisfied. For example, the RAID control unit 122 determines whether or not the number of disks subject to updating is equal to or greater than (the number of disks in the RAID configuration/2) and the number of strips in which the entire strip is subject to updating is (number of disks in the RAID configuration−2)−the number of disks, when the RAID device 101 is operating under RAID 5. For example, the RAID control unit 122 determines whether or not the number of disks subject to updating is equal to or greater than ((the number of disks in the RAID configuration−1)/2) and the number of strips in which the entire strip is subject to updating is (number of disks in the RAID configuration−3)− the number of disks for updating, when the RAID device 101 is operating under RAID 6.

If the condition 2 is satisfied, the processing proceeds to operation S506. If the condition 2 is not satisfied, the processing proceed to operation S505. The RAID 5 condition 2 may be the condition that the number of disks subject to updating is equal to or greater than (number of disks in the RAID configuration/2) and the number of strips in which the entire strip is subject to updating is equal to or greater than (number of disks in the RAID configuration−2)−the number of disks for updating. The RAID 6 condition 2 may be the condition that the number of disks subject to updating is equal to or greater than ((number of disks in the RAID configuration−1)/2) and the number of strips in which the entire strip is subject to updating is equal to or greater than (number of disks in the RAID configuration−3)−the number of disks for updating.

In operation S505, the RAID control unit 122 executes fill small write. In operation S506, the RAID control unit 122 executes fill read bandwidth write.

Figure 11:
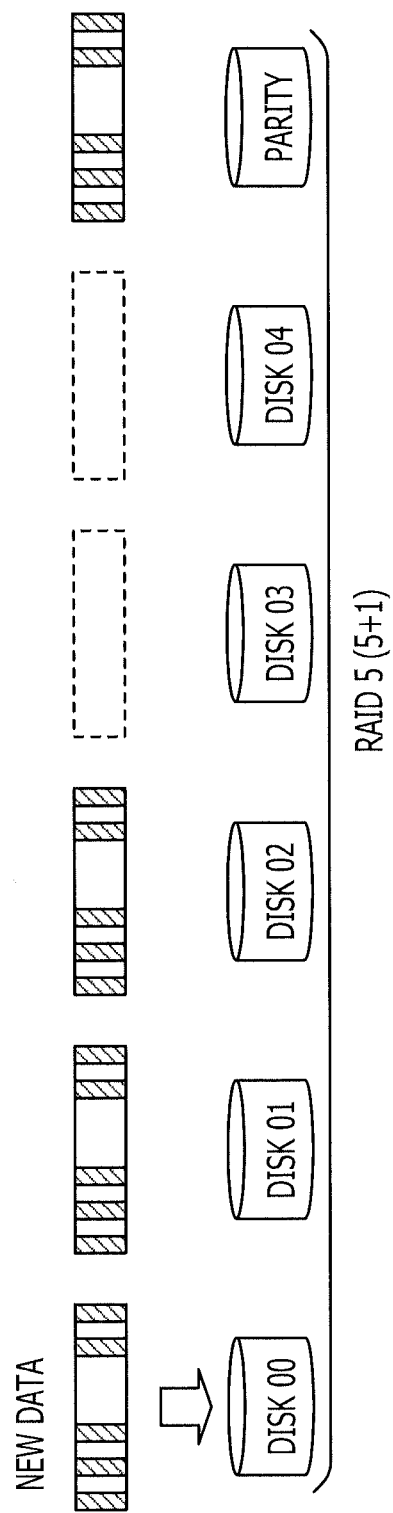
FIG. 11 illustrates exemplary new data and an exemplary disk configuration.

FIG. 11 illustrates exemplary new data and an exemplary disk configuration. FIG. 11 illustrates the disk configuration of the RAID device and the new data. The RAID device 101 illustrated in FIG. 11 performs RAID 5 with a RAID 5 (5+1) configuration, for example, with six disks.

The RAID device 101 includes six disk devices disk 00 to disk 05, and parity corresponding to the new data is stored in the disk 05.

The new data for the disks 00 to 02 and for disk 05 have twenty discrete regions as illustrated by the hatched portions in FIG. 11. The number of regions (number of regions with no updating other than parity) with no updating other than disk 05 may be fourteen.

The number of write method processing commands is illustrated in FIG. 11. The number of small write processing commands may be forty commands which is the total of twenty read commands (number of regions for updating) and twenty write commands (number of regions for updating).

The number of read bandwidth write processing commands may be thirty-four commands which is the total of fourteen read commands (number of regions with no updating other than parity) and twenty write commands (number of regions for updating).

The number of fill small write processing commands may be eight commands which is the total of four read commands (number of disks for updating) and four write commands (number of disks for updating). The number of fill read bandwidth write processing commands may be nine commands which is the total of five read commands (number of disks with no updating portions other than parity) and four write commands (number of disks for updating).

As illustrated in FIG. 11, the number of fill small write command processes may be reduced and the processing time may be shortened.

When the write method selection processing is adopted in FIG. 11, fill small write is executed since a discrete portion is present in the new data (operation S501: discrete), the condition 1 is not met (operation S503: condition not satisfied), and the number of disks subject to updating does not meet the condition 2 (operation S504: condition not satisfied).

Figure 12:
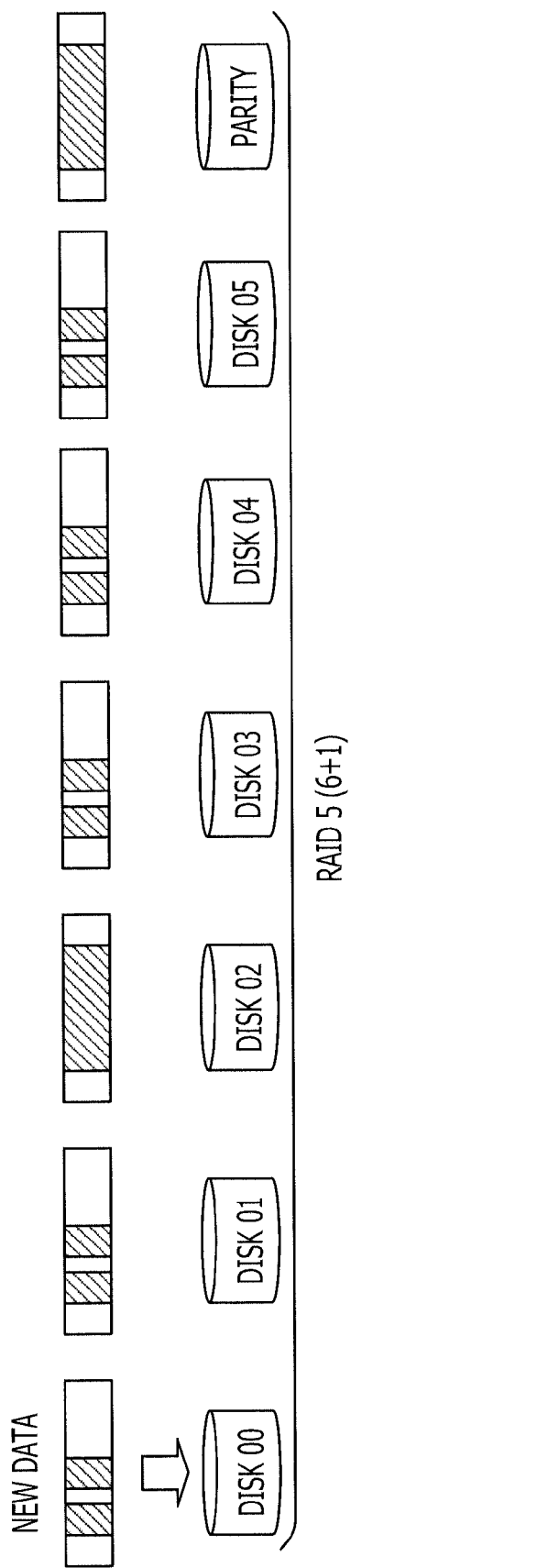
FIG. 12 illustrates exemplary new data and an exemplary disk configuration.

FIG. 12 illustrates exemplary new data and an exemplary disk configuration. FIG. 12 illustrates the disk configuration of the RAID device and the new data. The RAID device 101 performs RAID 5 with a RAID 5 (6+1) configuration, for example, with seven disks. The RAID device 101 includes seven disk devices disk 00 to disk 05, and parity corresponding to the new data is stored in the disk 06.

The new data for disks 00 to 06 has twelve discrete regions as illustrated with the hatched portions in FIG. 12. The number of regions (number of regions with no updating other than parity) with no updating other than disk 06 may be seventeen.

The number of write method processing commands is illustrated in FIG. 12. The number of small write processing commands may be twenty-four commands which is the total of twelve read commands (number of regions for updating) and twelve write commands (number of regions for updating).

The number of read bandwidth write processing commands may be twenty-nine commands which is the total of seventeen read commands (number of regions with no updating other than parity) and twelve write commands (number of regions for updating).

The number of fill small write processing commands may be fourteen commands which is the total of seven read commands (number of disks for updating) and seven write commands (number of disks for updating). The number of fill read bandwidth write processing commands may be thirteen commands which is the total of six read commands (number of disks with no updating portions other than parity) and seven write commands (number of disks for updating).

The number of fill read bandwidth write command processes may be reduced and the processing time may be shortened.

When the write method selection processing is adopted in FIG. 12, fill read bandwidth write is executed since discrete portions are present in the new data (operation S501: discrete) and the number of disks subject to updating meets the condition 1 (operation S503: condition is satisfied).

Figure 13:
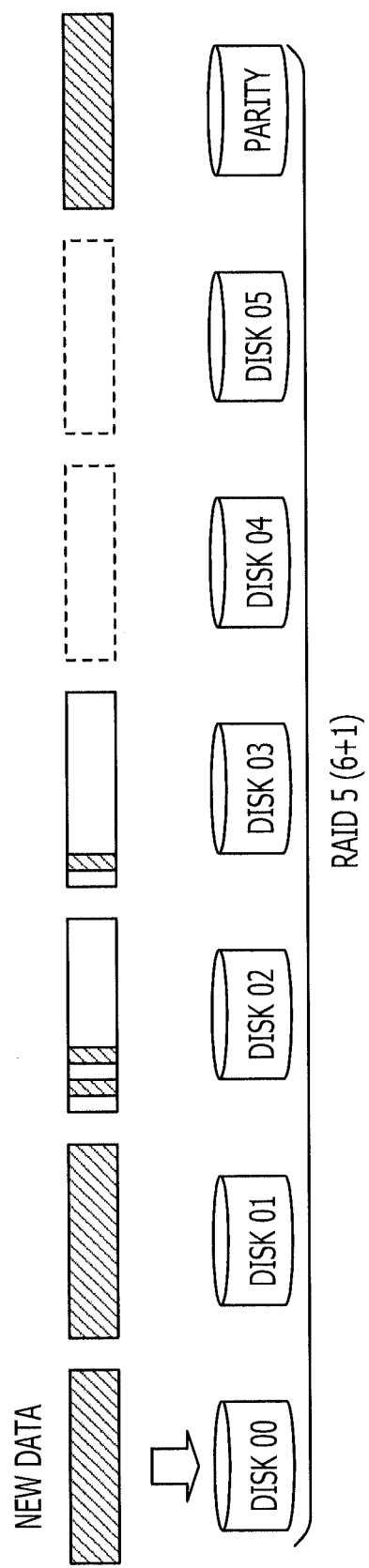
FIG. 13 illustrates exemplary new data and an exemplary disk configuration.

FIG. 13 illustrates exemplary data and an exemplary disk configuration. FIG. 13 illustrates the disk configuration of the RAID device and the new data.

The RAID device 101 is a RAID 5 (6+1) configuration and performs RAID 5 with a RAID 5 (6+1) configuration, for example, with seven disks. The RAID device 101 includes seven disk devices disk 00 to disk 06, and parity corresponding to the new data is stored in the disk 06.

The new data for disks 00 to 03 and disk 06 has six discrete regions as illustrated with the hatched portions in FIG. 13. The number of regions (number of regions with no updating other than parity) with no updating other than disk 06 may be seven.

The number of processing commands when the write methods are executed is illustrated in FIG. 13. The number of small write processing commands may be twelve commands which is the total of six read commands (number of regions for updating) and six write commands (number of regions for updating).

The number of read bandwidth write processing commands may be thirteen commands which is the total of seven read commands (number of regions with no updating other than parity) and six write commands (number of regions for updating).

The number of fill small write processing commands may be ten commands which is the total of five read commands (number of disks for updating) and five write commands (number of disks for updating). The number of fill read bandwidth write processing commands may be thirteen commands which is the total of four read commands (number of disks with no updating portions other than parity) and nine write commands (number of disks for updating).

The number of fill read bandwidth write command processes may be reduced and the processing time may be shortened. When the write method selection processing is adopted in FIG. 13, fill read bandwidth write is executed since discrete portions are present in the new data (operation S501: discrete) and the number of disks subject to updating does not meet the condition 1 (operation S503: condition is satisfied) but meets the condition 2 (operation S504: satisfied).

The number of commands for fill read bandwidth write and fill small write is illustrated in the case of a RAID 5 (9+1). In the RAID 5 (9+1), there is one disk in which parity is stored among the nine disks for storing data among the ten disks included in the RAID.

FIG. 14 illustrates an exemplary number of commands. The number of commands indicated in FIG. 14 may be the number of commands when the condition 1 is satisfied. If the number of update disks is equal to or greater than (number of disks in RAID configuration–2), for example, if condition 1 is satisfied, the number of commands when fill read bandwidth write is performed is not greater than the number of commands when fill small write is performed.

FIG. 15 illustrates an exemplary number of commands. The number of commands indicated in FIG. 15 may be the number of commands when the condition 2 is satisfied. If the number of update disks is equal to or greater than (number of disks in RAID configuration/2), and if the number of strips in which the entire strip is subject to updating is equal to or greater than ((number of disks in the RAID configuration–2)–number of disks for updating), for example, if condition 2 is satisfied, the number of commands when fill read bandwidth write is performed is not greater than the number of commands when fill small write is performed.

If the number of update disks is less than (number of disks in RAID configuration/2), the number of commands when fill small write is performed is not greater than the number of commands when fill read bandwidth write is performed.

The control unit 112 may read programs stored in the memory unit 113 or a portable recording medium and the like, and perform the abovementioned processing by executing the programs.

The portable recording medium may include a recording medium that is freely computer-readable such as a memory card, a flexible disk, a compact disk read only memory (CD-ROM), an optical disk, or a magnetic disc.

The speed of the write back processing when the new data is discrete may be improved. A write method with a high processing speed may be selected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A disk array device comprising:
a plurality of disk devices each including a strip that stores a parity or divided data which is obtained by dividing a stripe, and constructing a Redundant Arrays of Inexpensive Disks (RAID);
a control device to read and write the divided data from or into the plurality of disk devices in a unit of the strip; and
a memory to store new data that corresponds to the divided data stored in the strip,
wherein the control device detects whether or not the divided data to be updated by the new data is discrete in one or more fourth strips of one or more fourth disk devices in the plurality of disk devices and performs a first write operation or a second write operation when the divided data to be updated by the new data is discrete, a selection of one of the first write operation and the second write operation being performed based on conditions using a number of the one or more fourth disk devices and a value obtained by subtracting a specific value corresponding to a type of the RAID from a number of the plurality of disk devices of the RAID,
wherein, in the first operation, the control device reads one or more first strips of one or more first disk devices storing the divided data to be updated in the plurality of disk devices and a second strip of a second disk device storing the parity in the plurality of disk devices and writes the new data based on the first strips and the second strip,
wherein, in the second operation, the control device reads one or more third strips of one or more third disk devices not storing the divided data to be updated in the plurality of disk devices and the fourth strips, and writes the new data based on the third strips and the fourth strips.

2. The disk array device according to claim 1, wherein the first write operation includes:
issuing a read command to read the first strips and the second strip;
reading data of the first strips and the parity of the second strip;
generating a new parity using the data of the first strip, the parity, and the new data;
generating write data by combining the new data with the data of the first strips other than the divided data to be updated by the new data; and
writing the write data and the new parity in the plurality of disk devices.

3. The disk array device according to claim 2, wherein: the first write operation includes storing the parity and the data of the first strip in the memory.

4. The disk array device according to claim 1, wherein:
the second write operation comprises:
issuing a read command to read the third strips and the fourth strips;
reading data of the third strips and data of the fourth strips;
generating the new parity using the data of the third strip and the new data;
generating the write data combining the new data with the data of the fourth strips other than the divided data to be updated by the new data; and
writing the write data and the new parity in the plurality of disk devices.

5. The disk array device according to claim 4, wherein:
the first write operation includes recording the data in the memory.

6. The disk array device according to claim 1, wherein:
the control device selects one of the first write operation and the second write operation based on a number of disk devices to update data and the number of the plurality of disk devices.

7. The disk array device according to claim 1, wherein:
the control device selects one of the first write operation and the second write operation based on the number of strips in which the entire strip is subject to updating, the number of disk devices that update data, and the number of the plurality of disk devices.

8. The control device according to claim 1, wherein:
the selection is performed based on a number of one or more fifth strips of one or more fifth disk devices in the plurality of disk devices, each of the one or more fifth stripes entirely storing the divided data to be updated by the new data.

9. The disk array device according to claim 1, wherein the conditions includes whether the number of the one or more fourth disk devices is equal to or more than the value obtained by subtracting the specific value corresponding to the type of the RAID from the number of the plurality of disk devices of the RAID.

10. A control device of a disk array device including a plurality of disk devices configured to:
perform a read operation of a parity or divided data which is obtained by dividing a stripe from the plurality of disk devices in a unit of the strip, the plurality of disk devices constructing a Redundant Arrays of Inexpensive Disks (RAID);
perform a write operation of the divided data in the plurality of disk devices in the unit of the strip; determine whether or not the divided data to be updated by new data corresponding to the divided data is discrete in one or more fourth strips of one or more fourth disk devices in the plurality of disk devices; and
select one of a first write process and a second write process when the divided data to be updated by the new data is discrete based on conditions using a number of the one or more fourth disk devices and a value obtained by subtracting a specific value corresponding to a type of the RAID from a number of the plurality of disk devices of the RAID,
wherein, in the first write process, one or more first strips of one or more first disk devices storing the divided data to be undated in the plurality of disk devices and a second strip of a second disk device storing the parity in the plurality of disk devices are read, and the new data is written based on the first strips and the second strip,
wherein, in the second write process, one or more third strips of one or more third disk devices not storing the divided data to be undated in the plurality of disk devices, and the fourth strips are read, and the new data is written based on the third strips and the fourth strips.

11. The disk array device according to claim 10, wherein:
the selecting is performed based on a number of one or more fifth strips of one or more fifth disk devices in the plurality of disk devices, each of the one or more fifth stripes entirely storing the divided data to be updated by the new data.

12. The disk array device according to claim 10, wherein the conditions includes whether the number of the one or more fourth disk devices is equal to or more than the value obtained by subtracting the specific value corresponding to the type of the RAID from the number of the plurality of disk devices of the RAID.

13. A data write method comprising:
causing a disk array device including a plurality of disk devices, which construct a Redundant Arrays of Inexpensive Disks (RAID), to perform operations of:
performing a read operation of a parity or divided data which is obtained by dividing a stripe from the plurality of disk devices in a unit of the strip;
performing a write operation of the divided data in the plurality of disk devices in the unit of the strip;
determining whether or not the divided data to be updated by new data corresponding to the divided data is discrete in one or more fourth strips of one or more fourth disk devices in the plurality of disk devices;
selecting one of a first write process and a second write process when the divided data to be updated by the new data is discrete based on conditions using a number of the one or more fourth disk devices and a value obtained by subtracting a specific value corresponding to a type of the RAID from a number of the plurality of disk devices of the RAID,
issuing, in the first write process, a read command to read one or more first strips of one or more first disk devices storing the divided data to be undated in the plurality of disk devices and a second strip of a second disk device storing the parity in
the plurality of disk devices to write the new data based on the first strips and the second strip; and
issuing, in the second write process, a read command to read one or more third strips of one or more third disk devices not storing the divided data to be undated in the plurality of disk devices, and the fourth strips to write the new data based on the third strips and the fourth strips.

14. The data write method according to claim 13, wherein:
the selecting is performed based on number of one or more fifth strips of one or more fifth disk devices in the plurality of disk devices, each of the one or more fifth stripes entirely storing the divided data to be updated by the new data.

15. The data write method according to claim 13 wherein the conditions includes whether the number of the one or more fourth disk devices is equal to or more than the value obtained by subtracting the specific value corresponding to the type of the RAID from the number of the plurality of disk devices of the RAID.

* * * * *

UNITED STATES PATENT AND TRADEMARK OFFICE
CERTIFICATE OF CORRECTION

| | |
|---|---|
| PATENT NO. | : 9,128,846 B2 |
| APPLICATION NO. | : 13/650682 |
| DATED | : September 8, 2015 |
| INVENTOR(S) | : Ryota Tsukahara et al. |

It is certified that error appears in the above-identified patent and that said Letters Patent is hereby corrected as shown below:

In the claims,

Claim 8, Column 11, Line 4

Delete "control" and insert --disk array--, therefor.

Signed and Sealed this
First Day of December, 2015

Michelle K. Lee
*Director of the United States Patent and Trademark Office*